(12) United States Patent
Ikeda et al.

(10) Patent No.: US 8,786,219 B2
(45) Date of Patent: Jul. 22, 2014

(54) MOTOR CONTROL DEVICE

(75) Inventors: Hidetoshi Ikeda, Tokyo (JP); Yoshihiro Marushita, Tokyo (JP); Koichiro Ueda, Tokyo (JP); Yuji Igarashi, Tokyo (JP); Kiyoshi Maekawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 175 days.

(21) Appl. No.: 13/575,488

(22) PCT Filed: Jan. 25, 2011

(86) PCT No.: PCT/JP2011/051336
§ 371 (c)(1),
(2), (4) Date: Jul. 26, 2012

(87) PCT Pub. No.: WO2011/093281
PCT Pub. Date: Aug. 4, 2011

(65) Prior Publication Data
US 2012/0306426 A1      Dec. 6, 2012

(30) Foreign Application Priority Data
Jan. 27, 2010   (JP) ................................. 2010-015120

(51) Int. Cl.
  *B65H 59/38*     (2006.01)
  *H02P 5/00*      (2006.01)
  *G05D 3/12*      (2006.01)
(52) U.S. Cl.
  USPC ............... 318/6; 318/7; 318/560; 318/561; 242/334.1; 242/334.2; 360/71
(58) Field of Classification Search
  USPC ............... 318/6, 7, 609, 560, 561; 360/71; 242/334.1, 334.2
  See application file for complete search history.

(56) References Cited

U.S. PATENT DOCUMENTS 3,613,975 A * 10/1971 Knight ............................ 226/25
3,761,906 A *  9/1973 Finster et al. ................... 360/42
3,809,328 A *  5/1974 Cope et al. .................. 242/331.2

(Continued)

FOREIGN PATENT DOCUMENTS

JP        3 93486        4/1991
JP        4 121086       4/1992

(Continued)

OTHER PUBLICATIONS

International Search Report Issued Mar. 1, 2011 in PCT/JP11/51336 Filed Jan. 25, 2011.

*Primary Examiner* — Paul Ip
(74) *Attorney, Agent, or Firm* — Oblon, Spivak, McClelland, Maier & Neustadt, L.L.P.

(57) ABSTRACT

A motor control device includes: a feedforward computing section for computing a motion reference value and a feedforward driving force based on a motion command; a deviation compensation computing section for outputting a deviation compensation driving force by a control computation for reducing a control deviation; a driving-force command synthesizing section for outputting a driving-force command based on the feedforward driving force and the deviation compensation driving force; a reaction-force compensation computing section for computing a motion correction value based on a predetermined reaction-force reference value and the deviation compensation driving force; and a control-deviation computing section for computing the control deviation based on a deviation between the motion reference value and a motor motion detection value, and the motion correction value.

10 Claims, 6 Drawing Sheets

(56) References Cited

U.S. PATENT DOCUMENTS

| | | | | |
|---|---|---|---|---|
| 3,809,335 A | * | 5/1974 | Mantey | 242/334.2 |
| 4,051,415 A | * | 9/1977 | Martin | 318/7 |
| 4,084,768 A | * | 4/1978 | Hayashi | 242/414.1 |
| 4,126,817 A | * | 11/1978 | Luzio | 318/7 |
| 4,196,375 A | * | 4/1980 | Findeisen | 318/6 |
| 4,271,379 A | * | 6/1981 | Eckelmeyer | 318/77 |
| 4,335,336 A | * | 6/1982 | Filippini | 318/6 |
| 4,341,363 A | * | 7/1982 | Inatome | 242/334.1 |
| 4,347,993 A | * | 9/1982 | Leonard | 242/413.3 |
| 4,513,229 A | * | 4/1985 | Kudelski | 318/7 |
| 4,523,133 A | * | 6/1985 | Messenger | 318/7 |
| 5,022,599 A | * | 6/1991 | Nakade | 242/412.1 |
| 5,032,936 A | * | 7/1991 | Fujioka et al. | 360/71 |
| 5,248,112 A | * | 9/1993 | Rodal et al. | 242/334 |

FOREIGN PATENT DOCUMENTS

| | | |
|---|---|---|
| JP | 5 111274 | 4/1993 |
| JP | 10 225710 | 8/1998 |
| JP | 2004 288164 | 10/2004 |

* cited by examiner

MOTOR CONTROL DEVICE

TECHNICAL FIELD

The present invention relates to a motor control device for driving various industrial mechanical devices.

BACKGROUND ART

As a first conventional art of a motor control device, for example, a usage called web handling control for continuously conveying a band-like material (web) by using a roll rotated by a motor as in the case of a steel rolling line is envisaged. In the conventional art for the usage described above, for the purpose of preventing imbalance of a load torque in motors connected by a conveyed material from being increased, a speed control unit has been provided with a function called drooping for a long time (for example, see Patent Literature 1).

In the drooping control, a value corresponding to a proportional multiple of a signal indicative of a motor current, that is, a motor torque, is subtracted from a speed command, thereby providing a drooping characteristic (drooping) in which a motor speed decreases when the motor torque increases. In this manner, a function of preventing a load current of a specific motor among the plurality of motors connected by the conveyed material from being excessive is realized.

A motor control device described in Patent Literature 1 includes, as illustrated in FIG. 1 of Patent Literature 1, a speed control unit which is subjected to conventional drooping control (specifically, a speed control unit provided with a drooping characteristic by subtracting a drooping amount corresponding to a proportional multiple of an output of the speed control unit from the speed command) inside the motor control device. Further, the motor control device described in Patent Literature 1 additionally includes an acceleration/deceleration current computing unit for computing a torque required for acceleration/deceleration of the motor so that an output of the speed control unit and an output of the acceleration/deceleration current computing unit are added to be output as a torque command to the motor.

In this manner, a change in drooping amount in the case where the motor speed is accelerated/decelerated in response to a change in speed command can be eliminated. Thus, even when the motor speed is accelerated/decelerated, the motor can follow the command with high accuracy.

As a second conventional art of the motor control device, a machine tool controlled by an NC control device or the like, which is a usage different from that of the first conventional art, is envisaged. In the conventional art for the above-mentioned usage, parallel driving control in which a single driven object (work piece) is driven while being synchronously controlled by two motors is performed (for example, see Patent Literature 2).

In the case of the parallel driving control described above, the following problem occurs due to accuracy of a position detector for each of the motors or mechanical accuracy when the driven object and the motors are mechanically coupled to each other. Specifically, when the position of each of the motors is made completely equal to the command, a mechanical torsion occurs in the driven object to generate forces of the motors which pull each other (hereinafter, referred to as an interaxial interference force). As a result, heat generation or electric degradation of the motors or mechanical degradation of the driven object becomes a problem.

To cope with the above-mentioned problem, in the second conventional art, position control is performed on each of the motors while the same position command is issued to the two motors. At the same time, in the second conventional art, torque commands output by the motor control devices respectively to the two motors or actual torque detection values are compared with each other. Then, the position command to one of the motors is corrected based on a signal obtained by a difference between the torque commands or the actual torque detection values. In this manner, the interaxial interference force is suppressed to further suppress the heat generation or the electrical degradation of the motors or the mechanical degradation of the driven object.

CITATION LIST

Patent Literature

[PTL 1] JP 4-121086 A
[PTL 2] JP 2004-288164 A

SUMMARY OF INVENTION

Technical Problem

In the first conventional art, however, the above-mentioned drooping characteristic is merely provided to the speed control unit provided inside the motor control device. Therefore, there is a problem in that, for example, it is not easy to precisely maintain the motor torque to a value which equilibrates to a desired tension. Moreover, in the actual web handling control, control functions supporting various operating conditions in the handling control, such as a start operation and a steady operation of a conveyance line, and a protection operation in case of emergency, are required.

On the other hand, the speed of the motor and the torque have a causal relation and therefore, both the speed control and the torque control cannot be independently performed. Therefore, in the web handling control, highly functional control in consideration of the speed and the torque in combination, which supports various operating conditions, is required. In the conventional art described in Patent Literature 1, however, the drooping characteristic is simply provided to the relation between the torque and the speed in the speed control unit provided in the motor control device. Therefore, there is a problem in that highly functional control supporting various operating conditions is difficult to realize with simple computations.

In the second conventional art, a correction is performed based on the differential signal between the torque commands actually issued to the two motors or the torque detection values. Therefore, when characteristics of a mechanical system to be driven by the two motors are completely the same for both motors (specifically, the mechanical characteristics are symmetric), a good operation is performed.

However, for example, the case where the mechanical characteristic of the driven object is asymmetric such as the case where the driving is performed by motors having different capacities or the case the center of gravity of a mechanical load to be driven is eccentric is assumed. In the above-mentioned case, if the correction is performed simply based on the difference between the torque commands or the torque detection values, synchronous control accuracy for the positions is degraded due to a difference in torque, which is generated at the time of acceleration/deceleration. As a result, there is a problem that the synchronous control with higher accuracy cannot be easily achieved.

Further, the first conventional art and the second conventional art are configured as technologies for the motor control device limited to the usages such as the web handling control and the parallel driving control as described above. In the practical industry, however, it is envisaged to use a product prepared as a general-purpose motor control device which can be used for a wider range of usages so that the motor control device can support each of the usages described above. For the above-mentioned purpose, such measures as installation of a large number of functions supporting the usages in advance to a general-purpose motor control device or remodeling of the general-purpose motor control device in accordance with each of the usages to realize the motor control device supporting each of the usages are generally taken.

In the case of the former measure, however, there is a problem of increased cost due to an increased amount of programs installed in the motor control device. In the case of the latter measure, there is a problem of increased cost due to the efforts for remodeling, for supporting each of the usages.

The problems described above are summarized as follows.

The first conventional art has a problem in that it is not easy to precisely maintain the tension of the conveyed material to a desired value while the quick and accurate speed control is being performed in the usage of the web handling control such as the steel rolling line. Moreover, there is another problem in that it is not easy to realize the highly functional control supporting a complex request in accordance with various operating conditions in a simple manner.

The second conventional art has a problem in that it is difficult to precisely control the position of each of the motors while dealing with the problem of the interaxial interference force generated so as to twist the driven object in the usage for the parallel driving control such as the machine tool when the driven object driven by the plurality of motors has the asymmetric characteristics.

Moreover, with the first conventional art and the second conventional art, only an envisaged individual usage can be dealt with. Therefore, in order to deal with each of the usages by using the general-propose motor control device, there is a problem of increased cost for an increased amount of programs and the efforts for remodeling.

The present invention has been made to solve the problems described above and therefore, has an object to provide a motor control device capable of supporting a wide range of usages with the combination of a request for a motion such as a position or a speed of a motor and a request relating to a driving force of the motor to realize a wide range of highly functional characteristics by a simple computation.

Solution to Problem

According to the present invention, there is provided a motor control device for outputting a driving-force command to a current controller of a motor based on a motion command for a motion of the motor as a speed or a position and a motor motion detection value corresponding to a result of detection of the motion, the motor control device including: a feedforward computing section for computing a motion reference value corresponding to a reference signal for the motion of the motor and a feedforward driving force based on the motion command; a deviation compensation computing section for receiving a control deviation determined by a predetermined computation as an input to output a result of a control computation including an integral computation as a deviation compensation driving force, the control computation being performed by using a preset control parameter so as to reduce the control deviation; a driving-force command synthesizing section for outputting the driving-force command to the current controller by a computation for obtaining a sum of the feedforward driving force and the deviation compensation driving force as steady characteristics based on the feedforward driving force and the deviation compensation driving force; a reaction-force compensation computing section for computing a motion correction value based on a predetermined reaction-force reference value and the deviation compensation driving force; and a control-deviation computing section for computing the control deviation based on a deviation between the motion reference value and the motor motion detection value, and the motion correction value.

Advantageous Effects of Invention

The motor control device according to the present invention has a configuration of computing the motion correction value based on the predetermined reaction-force reference value and the deviation compensation driving force and a configuration of subtracting the motor motion detection value from the result of addition of the motion reference value and the motion correction value to compute the control deviation. In this manner, the motor control device capable of supporting a wide range of usages with the combination of the request for the motion such as the position and the speed of the motor and the request for the driving force of the motor to realize a wide range of highly functional characteristics with a simple computation can be obtained.

DESCRIPTION OF EMBODIMENTS

Hereinafter, preferred embodiments of a motor control device of the present invention are described with reference to the drawings.

Embodiment 1

Figure 1:
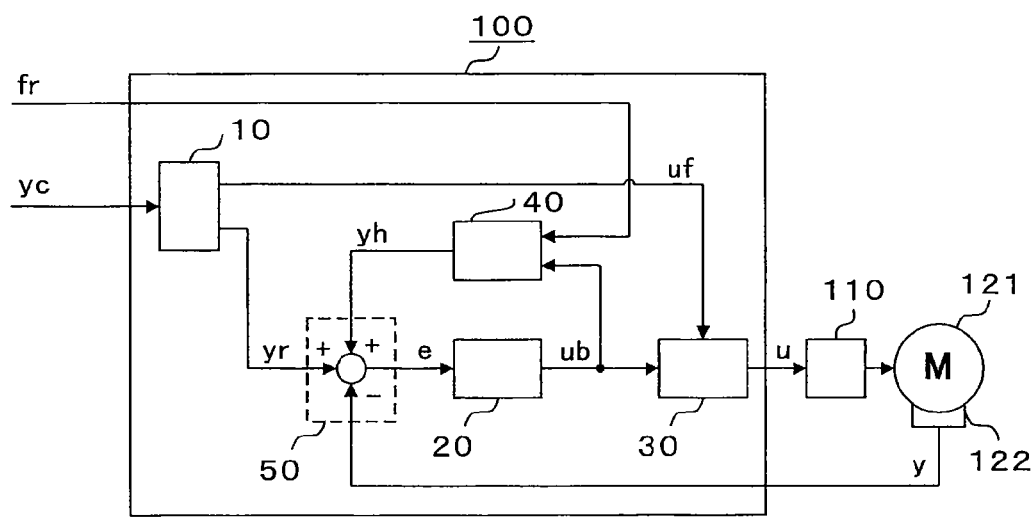
FIG. 1 A block diagram illustrating a motor control device of Embodiment 1 of the present invention.

FIG. 1 is a block diagram illustrating a motor control device of Embodiment 1 of the present invention. First, an overall operation of a motor control device 100 is described. In Embodiment 1, a motor control device to be used for web handling control is described. A mode in which the web handling control is performed based on speed control is described. However, the control is not limited to the speed control and can be similarly realized even in the case where position control is performed.

The motor control device 100 illustrated in FIG. 1 includes a feedforward computing section 10, a deviation compensation computing section 20, a torque-command synthesizing section 30, a reaction-force compensation computing section 40, and a control-deviation computing section 50. Further, the motor control device 100 is connected to a motor 121 through an intermediation of a current controller 110. A motion detector 122 detects a motor speed (motor motion detection value) y corresponding to a rotating speed of the motor 121 to input the motor speed to the motor control device 100. Together with the motor speed y, a speed command (motion command) yc and a reaction-force reference value fr are input from the exterior to the motor control device 100.

Next, each of functions of an internal configuration of the motor control device 100 is described in detail.

Based on the speed command yc, the feedforward computing section 10 computes and outputs a speed reference value (motion reference value) yr serving as a reference value for controlling the motor speed y of the motor 121 and a torque required for the motor 121 to move so that the motor speed becomes equal to the speed reference value yr as a feedforward torque uf.

The control-deviation computing section 50 receives the speed reference value yr, the motor speed y, and a motion correction value yh described below as inputs to output a control deviation e corresponding to a deviation signal to be reduced by feedback control. Next, the deviation compensation computing section 20 performs a feedback control computation including an integral operation for reducing the control deviation e to 0 in a steady manner by proportional-integral (PI) control performed on the control deviation e and outputs the result as a deviation compensation torque ub.

The reaction-force compensation computing section 40 receives the reaction-force reference value fr and the deviation compensation torque ub as inputs to output a motion correction value yh corresponding to a signal for correcting the motion of the motor 121 by a computation based on the comparison therebetween. The torque-command synthesizing section 30 receives the feedforward torque uf and the deviation compensation torque ub as inputs to output a torque command u.

The motor control device 100 outputs the torque command u to the current controller 110 so that the current controller 110 controls a current of the motor 121. As a result, the motor 121 generates a torque in response to the torque command u.

Figure 2:
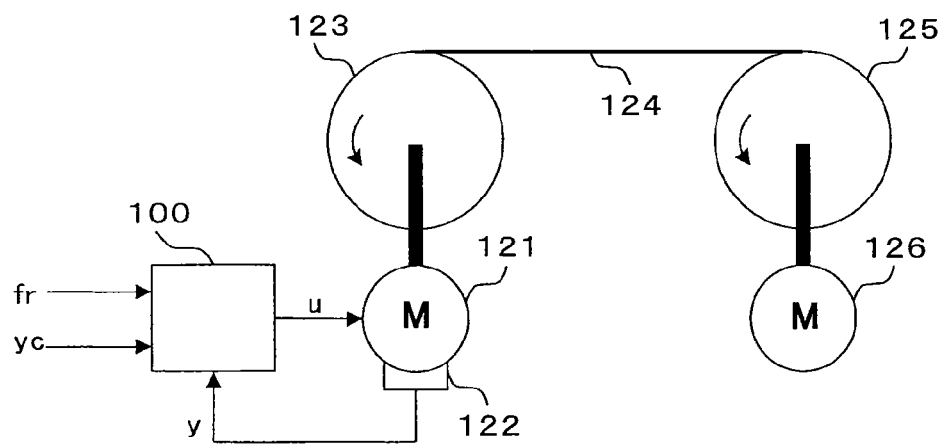
FIG. 2 A schematic view of a web handling control system using the motor control device of Embodiment 1 of the present invention.

FIG. 2 is a schematic view of a web handling control system using the motor control device 100 of Embodiment 1 of the present invention. The web handling control system illustrated in FIG. 2 includes the motor 121, the motion detector 122, a winding roll 123, a conveyed material 124, an unwinding roll 125, and an unwinding-axis motor 126.

The motor 121 drives the winding roll 123 to wind the conveyed material 124 having a band-like shape, such as a steel plate, a paper sheet, and a film. The conveyed material 124 is unwound from the unwinding roll 125. The unwinding roll 125 performs unwinding in accordance with a predetermined line speed by the unwinding-axis motor 126 which is subjected to speed control or the like.

The motor controller 100 outputs, as described above, the torque command u based on the motor speed y of the motor 121, which is detected by the motion detector 122, and the reaction-force reference value fr and the speed command yc which are input from the exterior, thereby controlling the torque to be generated by the motor 121 through an intermediation of a current controller (corresponding to the current controller 110 illustrated in FIG. 1 although not shown in FIG. 2).

Next, the details of the operation and features of the motor control device 100 illustrated in FIG. 2, which is used for the web handling control system described above, are described based on the configuration illustrated in FIG. 1. In the motor control device 100, a part obtained by removing the input of the reaction-force reference value fr, the reaction-force compensation computing section 40, and the motion correction value yh has a configuration common as two degrees of freedom control called reference model type control. First, an operation relating to the part mentioned above is described.

The feedforward computing section 10 outputs the result of the computation with a low-pass filter or the like, which is performed on the input speed command yc so that the motion of the motor 121 does not become vibrational, as the speed reference value yr. Simultaneously, the feedforward computing section 10 multiplies a differential value (acceleration) of the speed reference value yr by an inertia moment value of the motor 121 and a part to be driven by the motor 121 (driven object), such as the winding roll 123, to calculate an inertia torque required for the acceleration/deceleration of the motor 121.

Further, the feedforward computing section 10 calculates a friction torque generated in the driven object, based on the speed reference value yr, so as to output the sum of the inertia torque and the friction torque as the feedforward torque uf.

Here, it is assumed that the driven object, which includes the motor 121 and the winding roll 123, has a high mechanical stiffness and therefore, an inertia moment and a friction are precisely modeled. With such an assumption, if a tension generated in the conveyed material 124 is disregarded, the feedforward computing section 10 generates a torque necessary for the speed y of the motor 121 to follow a change in the speed reference value yr so as to be equal thereto as the feedforward torque uf.

Next, the control-deviation computing section 50 receives, as inputs, the speed reference value yr, the motor speed y, and the motion correction value yh computed by the reaction-force compensation computing section 40 described below. Then, based on those inputs, the control-deviation computing section 50 outputs a value obtained by adding the motion correction value yh to a value obtained by subtracting the motor speed y from the speed reference value yr (specifically, a speed deviation) as the control deviation e. The order of the addition and the subtraction is not particularly required to be the same as long as equivalent computations are performed.

Next, the deviation compensation computing section 20 receives the control deviation e as an input to perform the proportional-integral (PI) control expressed by Equation (1) below using an integral gain $\omega i$ and a proportional gain Kv corresponding to preset control parameters. Specifically, the deviation compensation computing section 20 performs a feedback control computation including the integral operation for reducing the control deviation e to 0 in a steady manner and outputs the result as the deviation compensation torque ub.

$$ub = Kv \times \{1 + (\omega i/s)\} \times e \qquad (1)$$
$$= Kv \times \{(s + \omega i)/s\} \times e$$

In Equation (1) given above, s represents a Laplace operator, and the integral gain ωi corresponds to a zero point of the deviation compensation computing section 20.

Figure 3:
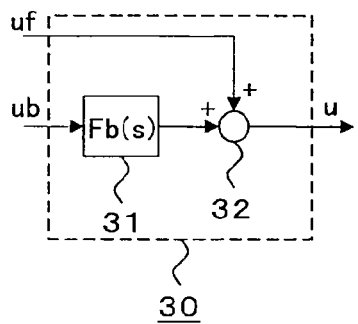
FIG. 3 A block diagram illustrating an internal configuration of a torque-command synthesizing section of Embodiment 1 of the present invention.

Next, a configuration of the torque-command synthesizing section 30 is described with reference to FIG. 3. FIG. 3 is a block diagram illustrating an internal configuration of the torque-command synthesizing section 30 of Embodiment 1 of the present invention. The torque-command synthesizing section 30 illustrated in FIG. 3 includes a feedback torque filter 31 and a torque adder 32.

The torque-command synthesizing section 30 receives the deviation compensation torque ub and the feedforward torque uf as inputs. Then, the feedback torque filter 31 included in the torque-command synthesizing section 30 performs a computation with a feedback torque filter Fb(s) on the deviation compensation torque ub so as to remove a predetermined frequency component other than a steady component therefrom.

The torque adder 32 adds an output of the feedback torque filter 31 and the feedforward torque uf and outputs the result of addition as the torque command u. Specifically, the torque-command synthesizing section 30 performs a computation expressed by Equation (2) below to perform a computation based on the feedforward torque uf and the deviation compensation torque ub so that the steady characteristic becomes equal to the result of addition of the torques.

$$u = uf + Fb(s) \times ub \qquad (2)$$

Here, the above-mentioned computation with the feedback torque filter Fb(s) is generally for removing the predetermined frequency component in a frequency range higher than a control band determined by the control parameters of the deviation compensation computing section 20, which are given above in Equation (1). For example, a filter called a low-pass filter, a notch filter or the like is used. In this manner, the computation has the purposes of improving the stability of a feedback control loop for feeding back the motor speed y and, at the same time, setting a gain of the deviation compensation computing section 20 high to reduce the control deviation e with a high response. From the above-mentioned fact, the feedback torque filter Fb(s) expressed by Equation (2) given above is indispensable for a higher response of a control system in normal speed control and is to provide complex characteristics in some cases.

As described above, in the motor control device 100 of Embodiment 1, the part excluding the input of the reaction-force reference value fr, the reaction-force compensation computing section 40, and the motion correction value yh has the configuration of two degrees of freedom control called reference model control. As a result, in the conditions where the effects of the tension of the conveyed material 124 are disregarded, the motor speed y can be controlled so as to be equal to the speed reference value yr with high precision.

Figure 4:
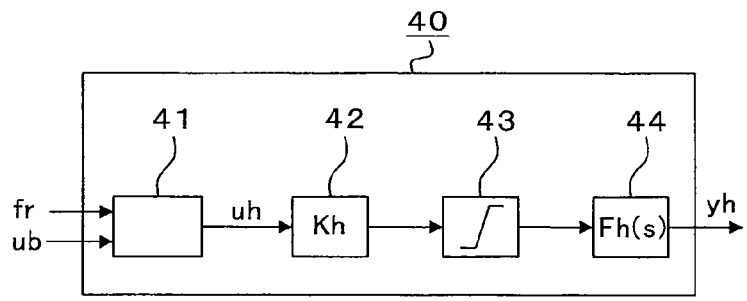
FIG. 4 A block diagram illustrating an internal configuration of a reaction-force compensation computing section of Embodiment 1 of the present invention.

Next, an operation of the reaction-force compensation computing section 40 is described. FIG. 4 is a block diagram illustrating an internal configuration of the reaction-force compensation computing section 40 of Embodiment 1 of the present invention. The reaction-force compensation computing section 40 illustrated in FIG. 4 includes a torque-correction-amount computing section 41, a reaction-force compensation amplifying section 42, a reaction-force compensation limiting section 43, and a reaction-force compensation filter 44. The reaction-force compensation computing section 40 receives the reaction-force reference value fr and the deviation compensation torque ub as inputs to compute a torque correction amount uh based on the comparison between the reaction-force reference value fr and the deviation compensation torque ub.

The case where an operation of conveying the conveyed material 124 with the application of a constant tension thereto is assumed in the web handling control system illustrated in FIG. 2 is considered. In this case, as the reaction-force reference value fr input from the exterior to the motor control device 100, a value of the torque of the motor 121 which equilibrates to the tension applied to the conveyed material 124 is set. Then, the torque-correction-amount computing section 41 compares the reaction-force reference value fr and the deviation compensation torque ub to output a reaction-force deviation fe corresponding to a difference therebetween as the torque correction amount uh.

Next, the reaction-force compensation amplifying section 42 outputs the result obtained by multiplying the torque correction amount uh by a reaction-force compensation gain Kh corresponding to a predetermined constant. Next, the reaction-force compensation limiting section 43 outputs the result obtained by limiting the magnitude of the output from the reaction-force compensation amplifying section 42 with a preset reaction-force compensation limiting value. Further, the reaction-force compensation filter 44 outputs the result of a computation through a low-pass filter Fh(s) having a predetermined pole, specifically, a cutoff frequency ωf, as expressed by Equation (3) below, which is performed on the output from the reaction-force compensation limiting section 43, as the motion correction value yh.

$$Fh(s) = \omega f/(s + \omega f) \qquad (3)$$

Here, the reaction-force compensation filter 44 described above is provided for the purpose of removing a high-frequency component from a computation loop including the deviation compensation computing section 20, the reaction-force compensation computing section 40, and the control-deviation computing section 50 so as to stably perform the computation of the computation loop.

Moreover, the reaction-force compensation computing section 40 sets the cutoff frequency ωf the reaction-force compensation filter 44 as expressed by Equation (4) below so that the cutoff frequency becomes equal to the integral gain ωi corresponding to the control parameter of the deviation compensation computing section 20, that is, the zero point in order to prevent the characteristics of the motor control device 100 from being unnecessarily complex and to easily realize desired control characteristics.

$$\omega f = \omega i \qquad (4)$$

The reaction-force compensation computing section 40 sets the reaction-force compensation gain Kh as expressed by Equation (5) below based on a reaction-force compensation frequency ωh corresponding to a parameter set from the exterior and the integral gain ωi and the proportional gain Kv corresponding to the control parameters of the deviation compensation computing section 20.

$$Kh = \omega h/(Kv \times \omega i) \qquad (5)$$

Here, the role of the deviation compensation torque ub is described. A torque required to compensate for the inertia moment and the friction for the acceleration/deceleration of the motor in accordance with a change in the speed command yc and that in the speed reference value yr is computed in the feedforward computing section 10 as the feedforward torque uf, which is then added to become the torque command u in the torque-command synthesizing section 30.

Therefore, the deviation compensation torque ub acts to compensate for a speed error of the motor 121, which is caused due to a modeling error in the feedforward computing section 10, such as a mechanical characteristic or a friction characteristic which cannot be modeled in a simple manner, and acts to apply a reaction-force required for the driven object including the motor 121 and the winding roll 123 to resist against the tension of the conveyed material 124. Specifically, the deviation compensation torque ub acts for the combination of the speed control of the motor 121 and the torque control for applying the tension to the conveyed material 124.

Therefore, by configuring the motor control device 100 as described above, the control deviation e is corrected by using the motion correction value yh so that the deviation compensation torque ub becomes closer to a torque which equilibrates to the tension to be generated in the conveyed material 124 while the speed control based on the speed command yc is performed. Accordingly, the tension to be generated in the conveyed material 124 can be controlled so as to be a value corresponding to the reaction-force reference value fr while the motor 121 is accelerated/decelerated to follow the speed command yc with high accuracy.

Next, more specific characteristics of the motor control device 100 are described. In the motor control device 100, a transfer function from the reaction-force reference value fr to the deviation compensation torque ub is expressed by the following Equation (6).

$$ub/fr = \omega h/(s+\omega h) \quad (6)$$

Specifically, a transfer characteristic from the reaction-force reference value fr to the deviation compensation torque ub becomes a low-pass characteristic having a reaction-force compensation frequency $\omega h$ as a cutoff frequency.

Through the addition of the reaction-force compensation computing section 40, a transfer function from the motor speed y to the deviation compensation torque ub, which is initially a proportional-integral characteristic with an inverted positive/negative sign in Equation (1) described above, changes to the following Equation (7).

$$ub/y = -Kv \times (s+\omega i)/(s+\omega h) \quad (7)$$

Specifically, through the addition of the counter compensation computing section 40, the transfer function from the motor speed y to the deviation compensation torque ub has a characteristic obtained by changing the integral operation in the proportional-integral computation into pseudo-integral. In other words, the characteristic described above is similar to a characteristic obtained by adding a highpass filter having the reaction-force compensation frequency $\omega h$ as the cutoff frequency to the characteristic of the deviation compensation computing section 20 expressed by the Equation (1) given above, which initially operates so that the steady deviation of the motor speed becomes 0.

From Equations (6) and (7) given above, the deviation compensation torque ub is a signal obtained by synthesizing a low-frequency component of the reaction-force reference value fr and a high-frequency component of the deviation compensation torque ub obtained when the reaction-force compensation computing section 40 is not added. As can be understood from Equations (6) and (7) given above, the range, where the reaction-force compensation frequency $\omega h$ can be set, can be as large as substantial infinity although there is a limitation due to a calculation period of the motor control device 100.

When the reaction-force compensation frequency $\omega h$ is set as large as substantial infinity as described above, the transfer function from the motor speed y to the deviation compensation torque ub substantially becomes zero while the transfer function from the reaction-force reference value fr to the deviation compensation torque ub substantially becomes 1. Specifically, the control loop for feeding back the motor speed y to the torque command u is substantially cut. At the same time, the deviation compensation torque ub is made equal to the reaction-force reference value fr, thereby realizing the characteristic for performing the torque control in a feedforward fashion.

Therefore, through setting of the reaction-force compensation frequency $\omega h$, the characteristics corresponding to the combination of the speed control in which the motor speed y is required to follow the speed command yc and the torque control in which the torque is generated in accordance with the reaction-force reference value fr can be realized as a wide range of characteristics in accordance with the features of the web handling control system or the purpose of the control.

When a problem due to the accuracy of the rotating motion of the winding roll 123 becomes big in the case where, for example, the acceleration/deceleration is performed abruptly or a torque ripple of the motor 121 becomes a problem, the characteristics of the speed control are set to be enhanced, specifically, the counter compensation frequency $\omega h$ is set lower. On the contrary, when there is a sudden change in tension such that the conveyed material 124 is suddenly pulled out, the characteristics of the torque control are set to be enhanced, specifically, the reaction-force compensation frequency $\omega h$ is set higher. Through the setting as described above, more stable web handling control can be performed.

Next, the features of the motor control device 100 of Embodiment 1 in terms of configuration to realize the characteristics corresponding to the combination of the speed control and the torque control as described above as a wide range of characteristics and as characteristics which are easy to grasp as expressed by Equations (6) and (7) given above are described.

In Embodiment 1, the reaction-force compensation computing section 40 includes the reaction-force compensation filter 44 to correspond to the characteristics of the deviation compensation computing section 20 which performs the proportional-integral computation so that the pole of the reaction-force compensation filter 44 becomes equal to the zero point of the deviation compensation computing section 20. Although the characteristics should be complex with the order of the denominators and the numerators of Equations (6) and (7) given above further higher by one order, the order is substantially reduced in the above-mentioned manner so that the characteristics can be set as simple characteristics as described above.

Moreover, an open-loop characteristic of the computation loop inside the motor control device 100 including the reaction-force compensation computing section 40, the control-deviation computing section 50, and the deviation compensation computing section 20 becomes a simple integral characteristic. As a result, a stable loop computation regardless of the gain is enabled. Therefore, a pole of the Equations (6) and (7) given above set with the reaction-force compensation frequency ωh, specifically, a closed-loop pole of an internal feedback loop can be easily set from 0 to infinity.

Moreover, by using the control parameters of the deviation compensation computing section 20, the reaction-force compensation gain Kh of the reaction-force compensation amplifying section 42 is set as expressed by Equation (5) given above. As a result, the characteristics of the motor control device 100 can be set to desired characteristics in view of the characteristics in the frequency domain corresponding to the reaction-force compensation frequency ωh set from the exterior.

Next, the effects obtained by the reaction-force compensation limiting section 43 are described. The reaction-force compensation limiting section 43 is set on the input side of the reaction-force compensation filter 44. The reaction-force compensation filter 44 is a low-pass filter as described above, and hence the motion correction vale yh output from the reaction-force compensation filter 44 is substantially limited by the reaction-force compensation limiting value. In this manner, even when the control corresponding to the combination of the torque control and the speed control as described above is performed, the speed control can be operated so that the steady deviation between the speed reference value yr and the motor speed y does not exceed the reaction-force compensation limiting value.

Therefore, even when, for example, the conveyed material 124 is cut, a function of preventing the deviation between the motor speed y and the speed command yc from being larger than a predetermined value to prevent runaway can be provided. Moreover, even when the modeling error in the computation of the feedforward torque uf performed in the feedforward computing section 10 is excessively large and an actual friction is larger than supposed, a function of preventing the motor speed y from being extremely small to prevent the winding from being difficult due to the excessive loosening of the conveyed material 124 can be provided.

Moreover, the reaction-force compensation limiting section 43 is provided not on the output side of the reaction-force compensation filter 44 but on the input side thereof. In this manner, the determination of limitation can be made earlier than in the case where the determination of limitation is made based on a signal delayed due to the function of the reaction-force compensation filter 44. As a result, the effects of suppressing overshooting during a limiting operation can be obtained. In addition, a change in the motion correction value yh caused when the limiting operation is performed is made gentle so as to reduce a shock on the control system.

In the description given above, supposing the case where the tension applied to the conveyed material 124 is constantly controlled while the speed control of the motor 121 is performed, the reaction-force compensation computing section 40 is configured to constantly operate so that the deviation compensation torque ub becomes equal to the reaction-force reference value fr. However, even in a similar web handling control system, the motor control device 100 is sometimes required to perform an operation in which the speed control is basically performed so that the motor speed y becomes equal to the speed command yc or the speed reference value yr as precisely as possible and then the speed control is switched to the tension control when the tension of the conveyed material 124 reaches a predetermined value, or the speed control is performed in the range where the tension of the conveyed material 124 does not become larger than the predetermined value as in the case where the following accuracy to the command is regarded as the most important so that motions of a plurality of motor axes are synchronous as much as possible as in the case of, for example, a printing machine, or in the case of a transient operation performed until a sufficient tension is applied at the start time of the web handling line. Therefore, highly functional control characteristics supporting different operating conditions are desired.

When the motor control device 100 is operated in response to requests in different operating conditions described above, in the operation of the torque-correction-amount computing section 41 included in the reaction-force compensation computing section 40a, the reaction-force deviation fe corresponding to a difference between the reaction-force reference value fr and the deviation compensation torque ub is simply directly used as the torque correction amount uh in the description given above. However, the torque correction amount uh can be computed with a non-linear computation based on the comparison between the reaction-force reference value fr and the deviation compensation torque ub by, for example, using the reaction-force deviation fe as the torque correction amount uh only when the counter deviation fe is negative and setting the torque correction amount uh to 0 when fe is positive.

As a result, in a state in which the tension of the conveyed material 124 is small, the deviation compensation torque ub is smaller than the reaction-force reference value fr. Therefore, the torque correction amount uh and the motion correction value yh become 0. The motor control device 100 operates merely for the speed control. On the other hand, when the tension of the conveyed material 124 becomes large, the deviation compensation torque ub becomes larger because the speed control is performed so as to resist against the increase in tension. Then, when the deviation compensation torque ub exceeds the reaction-force reference value fr, the reaction-force compensation computing section 40 outputs the motion correction value yh so as to reduce the speed of the motor 121. In this manner, highly functional control for performing control so that the tension of the conveyed material 124 does not become larger than the amount which equilibrates to the reaction-force reference value fr can be realized.

Next, the features of the motor control device 100 according to Embodiment 1 in terms of configuration, which can realize the highly functional control supporting various operating conditions in the web handling control as described above by a simple computation with the mere addition of the reaction-force compensation computing section 40, are described.

First, the motor control device 100 operates based on the speed control for computing the torque command u so that the motor speed y follows the speed command yc. Further, the motor control device 100 can have the characteristics of the combination of the speed control and the torque control in consideration of the tension of the conveyed material 124 by correcting the control computation referring to the reaction-force reference value fr input from the exterior, in contrast to the conventional drooping control.

As a method therefor, the control computation is corrected based on the result of a comparative computation such as a difference between the reaction-force reference value fr and a variable (deviation compensation torque ub) computed in the motor control device 100 or the like. In this manner, the control computation is corrected in accordance with the operating condition of the motor control device 100 considering a predetermined tension value as a reference. Therefore, by introducing a simple non-linear computation, the highly functional control in accordance with the operating condition can be realized.

Further, as the variable of the motor control device 100, which is to be compared with the reaction-force reference value fr, the deviation compensation torque ub corresponding to an intermediate variable for calculating the torque command u is used in the motor control device 100. The deviation compensation torque ub is a variable before the addition of the feedforward torque uf in the calculation process of the torque command u. Therefore, the torque necessary for the acceleration/deceleration of the motor 121 is not contained therein. Thus, for the acceleration/deceleration of the speed command yc, while the torque command u is generated by adding the feedforward torque uf so that the motor speed y precisely follows the speed command, only the torque corresponding to the tension to be applied to the conveyed material 124 is compared with the reaction-force reference value fr for the correction.

Moreover, the deviation compensation torque ub to be compared with the reaction-force reference value fr is a signal which is before being subjected to the feedback torque filter Fb(s) which is indispensable to increase a response speed of the speed feedback control. Therefore, an unnecessary delay in the loop computation performed inside the motor control device 100 including the deviation computation computing section 20 and the reaction-force compensation computing section 40 is removed so that the reaction-force compensation frequency ωh can be increased to substantial infinity.

As a result, a substantial restriction is not required to be set for the range where the reaction-force compensation frequency ωh is set. Therefore, the control for making the deviation compensation torque ub equal to the reaction-force reference value fr in accordance with the condition can be performed with a high response. Further, the characteristics of the motor control device 100 can be easily set to the desired combined characteristics.

In the description given above, the case where the torque-command synthesizing section 30 performs the computation illustrated in FIG. 3 referred to above and expressed by Equation (2) given above, that is, the computation so that the transfer function from the feedforward torque uf to the torque command u becomes 1 is described. Even if processing of changing the frequency component equal to or higher than the control band described above is performed, however, there is no substantial difference in effects.

For example, the torque command u may be computed by allowing the above-mentioned feedback torque filter Fb(s) to act on the sum of the feedforward torque uf and the deviation compensation torque ub instead of performing the computation illustrated in FIG. 3 referred to above and Equation (2) given above. Specifically, the torque-command synthesizing section 30 only needs to perform a computation so that the torque command u becomes equal to the sum of the signal obtained by removing the predetermined frequency components other than the steady component from the deviation compensation torque by the feedback torque filter Fb(s) and the signal containing the steady component of the feedforward torque uf. In this manner, the torque-command synthesizing section 30 performs the computation with the characteristics in which the steady characteristic becomes equal to the result of addition of the feedforward torque uf and the deviation compensation torque ub.

In the description given above, the reaction-force compensation computing section 40 sets the pole of the reaction-force compensation filter 44 equal to the zero point of the deviation compensation computing section 20. Even if the pole of the reaction-force compensation filter 44 is not set completely equal to the zero point, however, it is apparent that similar effects can be obtained.

As described above, according to Embodiment 1, with the above-mentioned configuration, in the motor control device to be used for the web handling control, the tension to be generated in the conveyed material can be constantly maintained to a desired value while the motor speed is controlled to precisely follow a change in the speed command. Further, the control corresponding to the combination of the speed control and the torque control responsive to the tension can be realized with a wide range of characteristics. Therefore, the highly functional control in accordance with various usages as the web handling control and the operating conditions can be realized with a simple computation.

Embodiment 2

Figure 5:
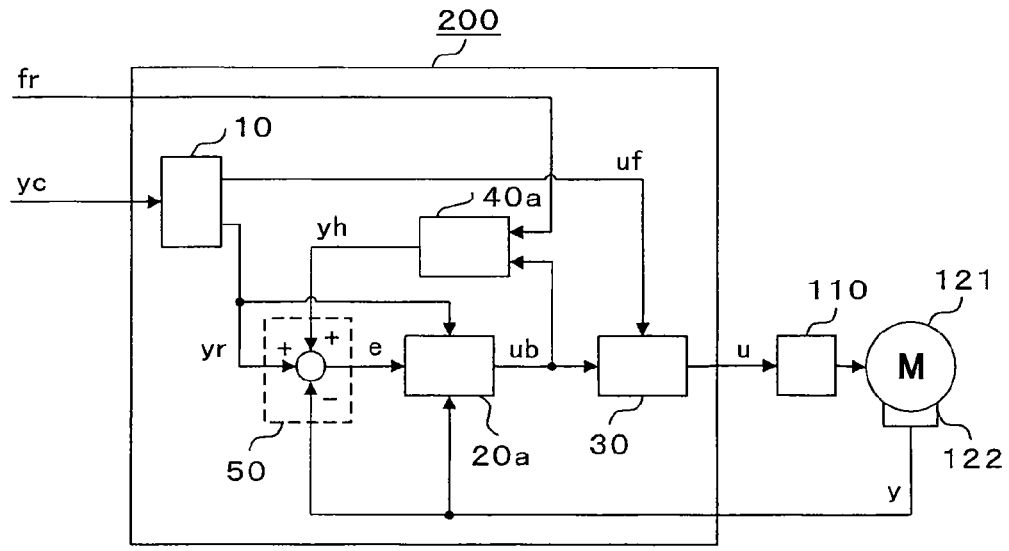
FIG. 5 A block diagram illustrating a motor control device of Embodiment 2 of the present invention.

FIG. 5 is a block diagram illustrating a motor control device of Embodiment 2 of the present invention. A motor control device 200 illustrated in FIG. 5 includes the feedforward computing section 10, a deviation compensation computing section 20a, the torque-command synthesizing section 30, a reaction-force compensation computing section 40a, and the control-deviation computing section 50. The same reference numerals as those of FIG. 1 denote the same parts, and the description thereof is herein omitted.

The motor control device 200 of Embodiment 2 is to be used for the web handling control system illustrated in FIG. 2 as in the case of Embodiment 1 described above and replaces the motor control device 100 illustrated in FIG. 2. In comparison with the motor control device 100 of Embodiment 1 described above, the motor control device 200 of Embodiment 2 includes the deviation compensation computing section 20a and the reaction-force compensation computing section 40a having different internal configurations.

Therefore, for the configuration of the motor control device 200, differences from FIG. 1 of Embodiment 1 described above are mainly described with reference to FIG. 5. First, the deviation compensation computing section 20a is described. The deviation compensation computing section 20 of Embodiment 1 described above performs the proportional-integral computation on the control deviation e. On the other hand, the deviation compensation computing section 20a of Embodiment 2 has a configuration of performing an integral computation and a proportional computation in a separate manner and slightly changing the inputs thereof.

Figure 6:
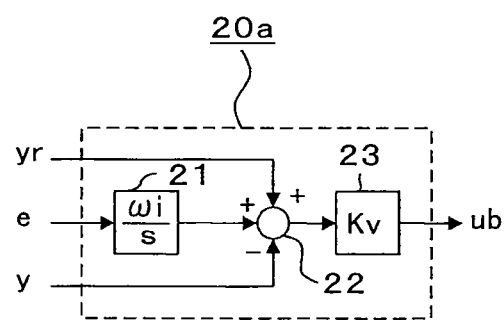
FIG. 6 A block diagram illustrating an internal configuration of a deviation compensation computing section of Embodiment 2 of the present invention.

FIG. 6 is a block diagram illustrating an internal configuration of the deviation compensation computing section 20a of Embodiment 2 of the present invention. The deviation compensation computing section 20a receives the control deviation e, the speed reference value yr, and the motor speed y as inputs. Then, inside the deviation compensation computing section 20a, an integral amplifier 21 outputs the result of a multiplication and an integral of the integral gain ωi corresponding to the preset control parameter on the control deviation e. An adder/subtractor 22 outputs the result of addition of the speed reference value yr to the output of the integral amplifier 21 and subtraction of the motor speed y therefrom. Further, a proportional amplifier 23 outputs a value obtained by multiplying the output of the adder/subtracter 22 by the proportional gain Kv corresponding to a preset control parameter as the deviation compensation torque ub.

Specifically, the deviation compensation computing section 20a performs a computation expressed by the following Equation (8).

$$ub = Kv\{(\omega i/s) \times e + (yr - y)\} \quad (8)$$

Therefore, the deviation compensation computing section 20a performs a feedback control computation including an integral operation for reducing the control deviation e to 0 in a steady manner so that a transfer characteristic from the control deviation e to the deviation compensation torque ub becomes an integral characteristic.

The second term in the curly bracket of the right side of Equation (8) given above is for a proportional compensation for the deviation between the speed reference value yr and the motor speed y. The second term has the effects of keeping the feedback loop of the motor speed y stably and of performing control so as to reduce the deviation between the speed reference value yr and the motor speed y transiently. However, the deviation compensation computing section 20a steadily operates so that the control deviation e integrated in Equation (8) given above becomes zero.

Figure 7:
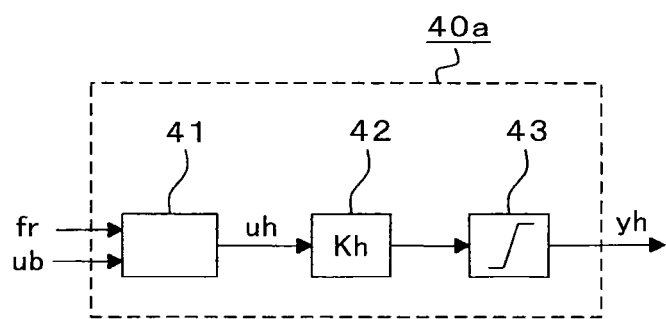
FIG. 7 A block diagram illustrating an internal configuration of a reaction-force compensation computing section of Embodiment 2 of the present invention.

Next, the reaction-force compensation computing section 40a is described. The reaction-force compensation computing section 40a receives the reaction-force reference value fr and the deviation compensation torque ub as inputs to output the motion correction value yh. FIG. 7 is a block diagram illustrating an internal configuration of the reaction-force compensation computing section 40a of Embodiment 2 of the present invention. The reaction-force compensation computing section 40a illustrated in FIG. 7 corresponds to the reaction-force compensation computing section 40 of Embodiment 1 described above, which is illustrated in FIG. 4, from which the reaction-force compensation filter 44 is removed, and the operation except for the reaction-force compensation filter 44 is the same.

Specifically, the reaction-force compensation computing section 40a receives the reaction-force reference value fr and the deviation compensation torque ub as inputs. Then, the torque-correction-amount computing section 41 included in the reaction-force compensation computing section 40a computes the torque correction amount uh based on the comparison between the reaction-force reference value fr and the deviation compensation torque ub. Next, the reaction-force compensation amplifying section 42 outputs the result obtained by multiplying the torque correction amount uh by the reaction-force compensation gain Kh corresponding to a predetermined constant.

Further, the reaction-force compensation limiting section 43 outputs the result of a limiting operation performed on the output of the reaction-force compensation amplifying section 42 with a preset reaction-force compensation limiting value as the motion correction value yh.

The reaction-force compensation computing section 40a uses the integral gain ωi and the proportional gain Kv corresponding to the control parameters of the deviation compensation computing section 20a, and the reaction-force compensation frequency ωh set from the exterior to set the reaction-force compensation Kh by using Equation (9) below as in the same manner as with Equation (5) given above in Embodiment 1.

$$Kh=\omega h/(Kv\times\omega i) \quad (9)$$

Moreover, the control-deviation computing section 50 receives the motion correction value yh, the speed reference value yr, and the motor speed y as in the case of Embodiment 1 described above to output a value obtained by subtracting the motor speed y from the value obtained by adding the speed reference value yr and the motion correction value yh as the control deviation e.

With the configuration of the motor control device 200 of Embodiment 2 described above, the transfer function from the reaction-force reference value fr to the deviation compensation torque ub is expressed by the following Equation (10).

$$ub/fr=\omega h/(s+\omega h) \quad (10)$$

The transfer function from the motor speed y to the deviation compensation torque ub is expressed by the following Equation (11).

$$ub/y=Kv\times(s+\omega i)/(s+\omega h) \quad (11)$$

Equations (10) and (11) given above are completely the same as Equations (6) and (7) of Embodiment 1 given above. Specifically, the deviation compensation computing section 20 of Embodiment 1 described above performs the proportional-integral computation. On the other hand, in Embodiment 2, the configuration is changed as described above to perform the computation so that the transfer function from the control deviation e to the deviation compensation torque ub has the integral characteristic. Therefore, the reaction-force compensation filter 44, which is necessary for the reaction-force compensation computing section 40 of Embodiment 1 described above, is not necessary in Embodiment 2. The amount of computation is correspondingly reduced so that the equivalent characteristics can be realized with simple computations.

In order to precisely keep the tension of the conveyed material 124 to a desired value as in the case where a value supposed as a roll diameter of the winding roll 123 is different from an actual value, it is necessary to provide a steady deviation between the speed command yc and the motor speed y. The case where a steady value of the deviation compensation torque ub is required to be made perfectly equal to a value specified by the reaction-force reference value fr under the condition described above is envisaged. In such a case, it is easily understood that the computation of the reaction-force compensation amplifying section 42 in the reaction-force compensation computing section 40a, which is a mere proportional computation in the description given above, is replaced by a proportional-integral computation.

As described above, according to Embodiment 2, by providing the configuration described above, the motor speed is controlled to precisely follow a change in the speed command while the tension to be generated in the conveyed material can be kept constant to a desired value in the motor control device to be used for the web handling control, as in the case of Embodiment 1 described above. Further, the control corresponding to the combination of the speed control and the torque control corresponding to the tension can be realized with a wide range of characteristics. Therefore, the highly functional control in accordance with various usages and operating conditions as the web handling control can be realized with simple computations.

Embodiment 3

Figure 8:
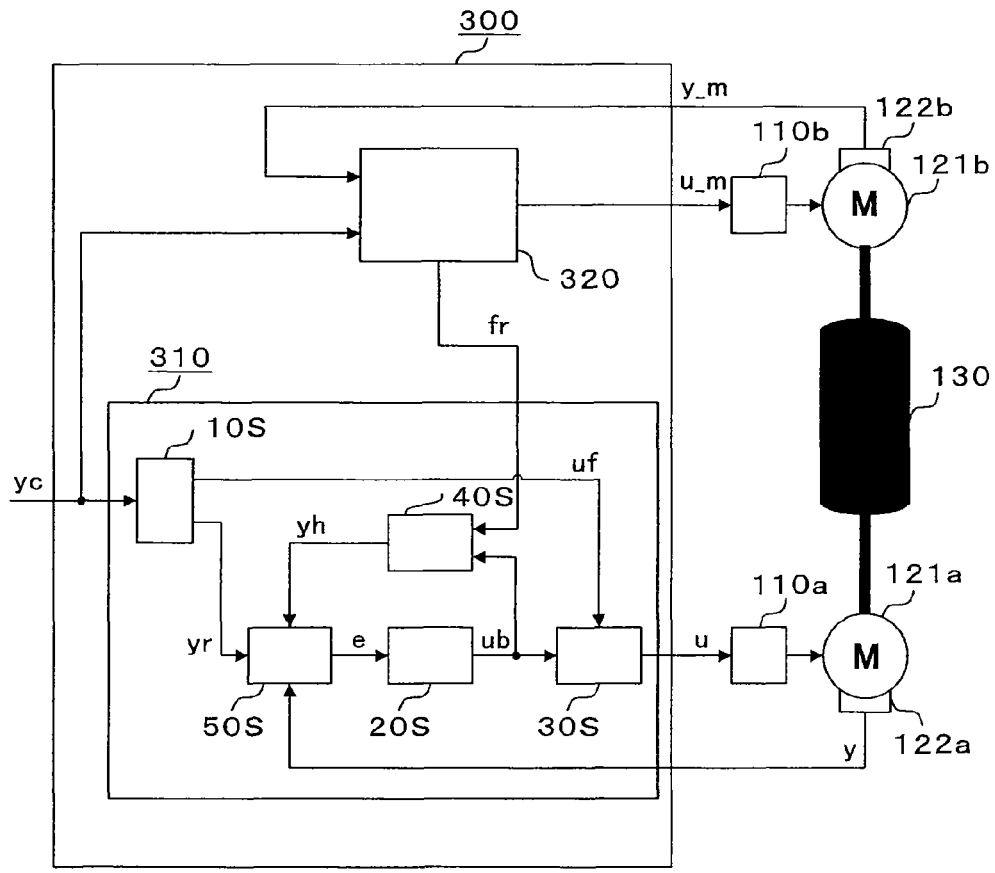
FIG. 8 A block diagram illustrating a motor control device of Embodiment 3 of the present invention.

FIG. 8 is a block diagram illustrating a motor control device of Embodiment 3 of the present invention. Embodiment 3 supposes the use for parallel driving control in which a single driven object (work piece) is driven while being synchronously controlled by two motors. This embodiment deals with a problem in that an increased interaxial interference force due to a mechanical torsion between the motors is increased if the precise position control of each axis is simply performed for an error of the position detector for detecting the positions of the two motors or a mechanical error generated when the driven object and the motors are mechanically coupled to each other (hereinafter, referred to as an interaxial mechanical error) in the parallel driving control described above.

Although both the position control and the speed control are envisaged in the parallel driving control described above, parallel driving control with the position control is described in Embodiment 3. Moreover, Embodiment 3 is completely the same even in the case where rotary drive with a rotary motor is performed and in the case where linear drive with a linear motor is performed. However, the terms used for the rotary drive are used for the following description.

First, an overall configuration of a motor control device 300 is described with reference to FIG. 8. The motor control device 300 illustrated in FIG. 8 includes a slave-axis control unit 310 and a master-axis control unit 320. The slave-axis control unit 310 is connected to a motor (slave-axis motor) 121a through an intermediation of a current controller (slave-axis current controller) 110a. Similarly, the master-axis control unit 320 is connected to a master-axis motor 121b through an intermediation of a master-axis current controller 110b.

Each of the motor 121a and the master-axis motor 121b drives a single driven object 130 through an intermediation of a shaft or a ball screw, respectively. A motion detector 122a and a master-axis motion detector 122b detect positions of rotation of the motor 121a and the master-axis motor 121b respectively as a motor position (motor motion detection value) y and a master-axis motor position y_m and input the motor position y and the master-axis motor position y_m to the motor control device 300.

A position command (motion command) yc is input to the motor control device 300 from the exterior. The master-axis control unit 320 receives the position command yc and the master-axis motor position y_m as inputs to output a master-axis torque command u_m for the master-axis motor 121b and the reaction-force reference value fr for the slave-axis control unit 310 by a computation described later. On the other hand, the slave-axis control unit 310 receives the position command yc, the motor position y, and the reaction-force reference fr as inputs to output the torque command u for the motor 121a by a computation described later.

The motor control device 300 outputs the torque command u and the master-axis torque command u_m respectively to the current controller 110a and the master-axis current controller 110b. Then, the current controller 110a and the master-axis current controller 110b respectively control currents of the motor 121a and the master-axis motor 121b based on the torque command u and the master-axis torque command u_m. As a result, the motor 121a generates a torque in response to the torque command u, whereas the master-axis motor 121b generates a torque in response to the master-axis torque command u_m.

The slave-axis control unit 310 includes a feedforward computing section 10S, a deviation compensation computing section 20S, a torque-command synthesizing section 30S, a reaction-force compensation computing section 40S, and a control-deviation computing section 50S as in the case of the motor control device 100 described above in Embodiment 1. Therefore, first, the sections of the slave-axis control unit 310 other than the reaction-force compensation computing section 40S, which operate as in the case of normal position control, are described.

The feedforward computing section 10S outputs the result of a computation with a low-pass filter or the like performed on the input position command yc so that the motion of the motor 121a does not become vibrational, as a position reference value (motion reference value) yr. Simultaneously, the feedforward computing section 10S calculates a torque necessary for the acceleration/deceleration of the motor 121a based on a computation of multiplying an acceleration signal obtained by second-order differential of the position reference value yr by a set value of an inertia moment of a driven part driven by the motor 121a to output the calculated torque as the feedforward torque uf.

The above-mentioned inertia moment of the driven part driven by the motor 121a is a part of all the inertia moment of the motor (slave-axis motor) 121a, the master-axis motor 121b, and the driven object 130, which is assigned to the slave-axis motor 121a. Therefore, when the master-axis motor 121b and the slave-axis motor 121a, and the driven object 140 are configured perfectly symmetrical, the inertia moment assigned to the driven part is a half of all the inertia moment. However, when, for example, the capacities of the slave-axis motor 121a and the master-axis motor 121b are different from each other or the center of gravity of the driven object 130 is eccentric, all the inertia moment is set to be assigned at an appropriate rate so that the driven object 130 and the motors are driven in synchronization.

Figure 9:
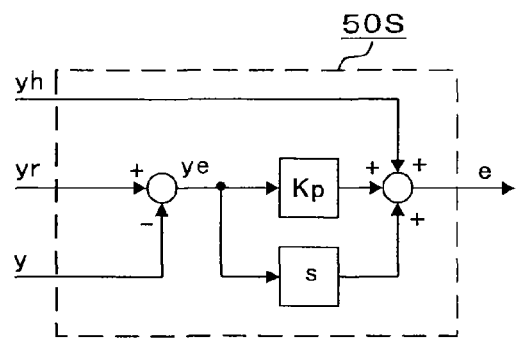
FIG. 9 A block diagram illustrating an internal configuration of a control-deviation computing section of Embodiment 3 of the present invention.

Next, an operation of the control-deviation computing section 50S included in the slave-axis control unit 310 is described with reference to FIG. 9. FIG. 9 is a block diagram illustrating an internal configuration of the control-deviation computing section 50S of Embodiment 3 of the present invention. The control-deviation computing section 50S receives the position reference value yr, the motor position y, and the motion correction value yh described below as inputs to output, as the control deviation e, a signal obtained by adding a signal obtained by multiplying a position deviation ye corresponding to a deviation between the position reference value yr and the motor position y by a position gain Kp, a signal obtained by differentiating the position deviation ye (speed deviation), and the motion correction value yh.

Through the above-mentioned computation, the control deviation e is computed so as to become a signal having dimensions of the speed. Essentially, however, the control-deviation computing section 50S computes the control deviation e to be reduced as a linear sum obtained by adding the position deviation ye, the differential value (speed deviation) thereof, and the motion correction value yh at an appropriate rate. Specifically, the control deviation e is output by the computation based on the deviation between the position reference value yr and the motor position y, and the motion correction value yh.

The deviation compensation computing section 20S performs the proportional-integral (PI) control expressed by Equation (1) given above using the integral gain $\omega i$ and the proportional gain Kv corresponding to the preset control parameters, as in the case of the deviation compensation computing section 20 of Embodiment 1 described above. In this manner, the deviation compensation computing section 20S performs a feedback control computation including an integral operation for reducing the control deviation e to 0 in a steady manner and outputs the result as the deviation compensation torque ub.

The torque-command synthesizing section 30S performs the computation expressed by Equation (2) given above with the deviation compensation torque ub and the feedforward torque uf as inputs by using the feedback torque filter Fb(s) to output the torque command u, as in the case of the torque-command synthesizing section 30 illustrated in FIG. 3 and described above in Embodiment 1. Here, for the computation with the feedback torque filter Fb(s), a filter called a low-pass filter or a notch filter, for reducing a predetermined frequency component, is used as in the case of Embodiment 1 described above.

The feedback torque filter Fb(s) has the purpose of improving the stability of the control system in response to a mechanical resonance in the driven object 130 to set the gain of the deviation compensation computing section 20S high so as to reduce the control deviation e with a high response. From this fact, the feedback torque filter Fb(s) included in the torque-command synthesizing section 30S is indispensable for general position control and provides complex characteristics in some cases.

Figure 10:
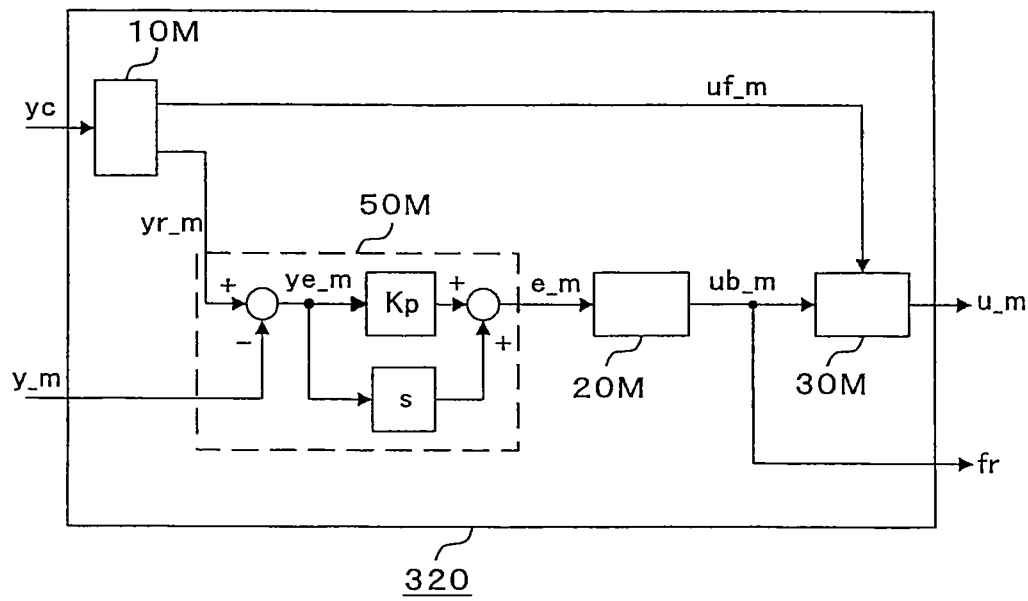
FIG. 10 A block diagram illustrating an internal configuration of a master-axis control unit of Embodiment 3 of the present invention.

Next, a configuration of the master-axis control unit 320 is described with reference to FIG. 10. FIG. 10 is a block diagram illustrating an internal configuration of the master-axis control unit 320 of Embodiment 3 of the present invention. The master-axis control unit 320 includes a master-axis feedforward computing section 10M, a master-axis deviation compensation computing section 20M, a master-axis torque-command synthesizing section 30M, and a master-axis control-deviation computing section 50M. The master-axis control unit 320 is a part for performing control on the master-axis motor 121b and has a configuration similar to that of the part obtained by removing the reaction-force compensation computing section 40S from the slave-axis control unit 310.

The master-axis feedforward computing section 10M included in the master-axis control unit 320 outputs a master-axis position reference value yr_m and a master-axis feedforward torque uf_m based on the position command yc by a computation similar to that performed by the feedforward computing section 10S for the driven-motor motor 121a.

In the feedforward computing section 10S of the slave-axis control unit 310, however, a value assigned from all the inertia moment to allow the driving by the slave-axis motor 121a is set as the set value of the inertia moment used for the computation of the feedforward torque. On the other hand, the master-axis feedforward computing section 10M uses the set value of the inertia moment obtained by the appropriate distribution to allow the driving by the master-axis motor 121b to perform the computation of the master-axis feedforward torque uf_m.

The master-axis control-deviation computing section 50M included in the master-axis control unit 320 performs an operation similar to that obtained by removing the input of the motion correction value yh from the control-deviation computing section 50S in the slave-axis control unit 310. Specifically, the master-axis control-deviation computing section 50M outputs, as the master-axis control deviation e_m, the result obtained by adding a signal obtained by multiplying a master-axis position deviation ye_m by the position gain and a master-axis speed deviation obtained by differentiating the master-axis position deviation ye_m to the master-axis position deviation ye_m corresponding to a deviation of the master-axis position reference value yr_m and the master-axis motor position y_m.

Moreover, the master-axis deviation compensation computing section 20M outputs the master-axis deviation compensation torque ub_m by a computation based on the master-axis control deviation, which is similar to that of the deviation compensation computing section 20S for the slave-axis motor 121a.

Moreover, the master-axis torque command synthesizing section 30M performs a computation similar to the computation of Equation (2) given above, which is performed by the torque-command synthesizing section 30S of the slave-axis control unit 310 on the deviation compensation torque ub and the feedforward torque uf, on the master-axis deviation compensation torque ub_m and the master-axis feedforward torque uf_m, to output the master-axis torque command u_m.

Through the computations described above, the master-axis control unit 320 outputs the master-axis torque command u_m based on the input position command yc. Further, simultaneously, the master-axis control unit 320 outputs the master-axis deviation compensation torque ub_m as the reaction-force reference value fr for the slave-axis control unit 310.

Figure 11:
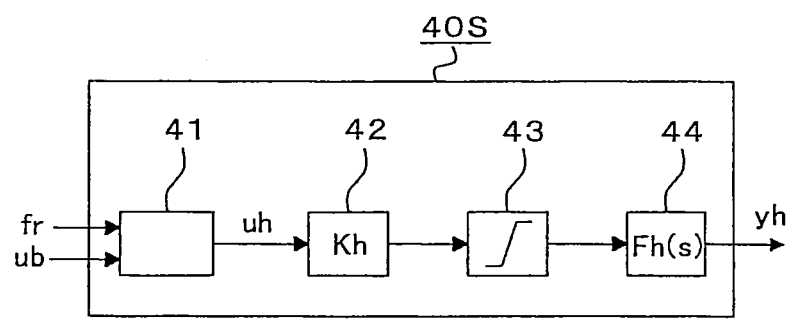
FIG. 11 A block diagram illustrating an internal configuration of a reaction-force compensation computing section of Embodiment 3 of the present invention.

Next, an operation of the reaction-force compensation computing section 40S included in the slave-axis control unit 310 is described with reference to FIG. 11. FIG. 11 is a block diagram illustrating an internal configuration of the reaction-force compensation computing section 40S of Embodiment 3 of the present invention. The reaction-force computing section 40S includes the torque-correction-amount computing section 41, the reaction-force compensation amplifying section 42, the reaction-force compensation limiting section 43, and the reaction-force compensation filter 44 and performs a computation similar to that performed by the reaction-force compensation computing section 40 illustrated in FIG. 4 of Embodiment 1 described above. Specifically, the reaction-force compensation computing section 40S receives the reaction-force reference value fr output from the master-axis control unit 320 and the deviation compensation torque ub output from the deviation compensation computing section 20S included in the slave-axis control unit 310 as inputs.

Then, based on the comparison between the reaction-force reference value fr and the deviation compensation torque ub, the torque-correction-amount computing section 41 outputs a signal obtained by performing an operation in a non-linear dead zone in accordance with previous setting on the reaction-force deviation fe corresponding to a difference therebetween as the torque correction amount uh.

The reaction-force compensation amplifying section 42 multiplies the torque correction amount uh by the reaction-force compensation gain Kh corresponding to a predetermined constant and outputs the result of multiplication. The reaction-force compensation limiting section 43 outputs the result of non-linear processing for limiting the magnitude with a preset reaction-force compensation limiting value, which is performed on the output of the reaction-force compensation amplifying section 42. Further, the reaction-force compensation filter 44 outputs the result of the computation with the low-pass filter Fh(s) having the cutoff frequency ωf on the output of the reaction-force compensation limiting section 43 as in the case of Equation (3) given above in Embodiment 1, as the motion correction value yh.

Moreover, the reaction-force compensation computing section 40S sets the pole of the reaction-force compensation filter 44, that is, the cutoff frequency ωf so that the pole becomes equal to the integral gain ωi corresponding to the zero point of the proportional-integral computation performed in the deviation compensation computing section 20S. The reaction-force compensation computing section 40S also sets the above-mentioned reaction-force compensation gain Kh by using Equation (5) described above in Embodiment 1 based on the reaction-force compensation frequency ωh corresponding to a parameter set from the exterior and the control parameters of the deviation compensation computing section 20S.

The motor control unit 300 operates as described above and therefore, drives the motors respectively by using the feedforward torque uf and the master-axis feedforward torque uf_m computed by separately setting the values of the inertia moment, which are to be assigned to the slave-axis motor 121a and the master-axis motor 121b in the feedforward computing section 10S included in the slave-axis control unit 310 and in the master-axis feedforward computing section 10M included in the master-axis control unit 320.

As a result, even when the capacities of the respective motors differ from each other or the center of gravity of the driven object 130 is eccentric, the motors can be driven in precise synchronization with each other to perform acceleration/deceleration so as to precisely follow the position command yc. Further, the motion of the slave-axis motor can be corrected to suppress the interaxial interference force generated so as to twist the driven object 130 between the slave-axis motor 121a and the master-axis motor 121b.

The characteristics obtained by the motor control device 300 are described further in detail. The case where the characteristics are described as linear characteristics obtained when the dead zone described above is not set in the torque-correction-amount computing section 41 of the reaction-force compensation computing section 40S illustrated in FIG. 11 referred to above and the reaction-force compensation limiting section 43 does not perform the limiting operation is considered. In this case, in the motor control device 300, a transfer function from the master-axis deviation compensation torque ub_m, that is, the reaction-force reference value fr, to the deviation compensation torque ub becomes a low-pass characteristic expressed by Equation (12) below as in the case of Equation (6) given above in Embodiment 1 described above.

$$ub/ub\_m=\omega h/(s+\omega h) \quad (12)$$

A transfer function from the motor position y of the slave-axis motor 121a to the deviation compensation torque ub is expressed by the following Equation (13).

$$ub/y=-Kv\times(s+\omega i)\times(s+Kp)/(s+\omega h) \quad (13)$$

Here, in a state in which the reaction-force compensation computing section 40S is removed, that is, when the reaction-force compensation frequency $\omega h$ is equivalently set to 0 in the slave-axis control unit 310, Equation (12) given above becomes 0, whereas Equation (13) described above becomes a characteristic equivalent to proportional-integral-derivative (PID) control including an integral operation. Specifically, the slave-axis control unit 310 has merely the characteristics of the position control. Therefore, the motor control device 300 performs the position control on the position command yc so that both the master-axis motor position y_m and the slave-axis motor position y have a steady deviation of 0.

Next, when the reaction-force compensation frequency $\omega h$ is set larger than 0, the deviation compensation torque ub is computed by Equation (13) given above so that the control characteristics for the motor position y become characteristics obtained by replacing an integrator of the PID control by a pseudo-integrator, in other words, a control characteristic similar to that obtained in the case where a highpass filter having the reaction-force compensation frequency $\omega h$ as the cutoff frequency acts on the PID control. Moreover, simultaneously with the computation described above, the deviation compensation torque ub is obtained by a computation of adding a signal obtained by allowing a low-pass filter having the reaction-force compensation frequency $\omega h$ to act as the cutoff frequency on the reaction-force reference value fr, that is, the master-axis deviation compensation torque ub_m. Specifically, the slave-axis control unit 310 has control characteristics obtained by combining the characteristics of the position control and the characteristics of the torque control at the reaction-force compensation frequency $\omega h$ as a boundary.

Moreover, when the reaction-force compensation frequency $\omega h$ is increased to substantial infinity (maximum value limited in terms of a sampling period), the transfer function expressed by Equation (12) given above substantially becomes 1, whereas the transfer function expressed by Equation (13) given above substantially becomes 0. Therefore, control for constantly making the deviation compensation torque ub for the slave-axis motor 121a equal to the master-axis deviation compensation torque ub_m, that is, a computation for allowing the slave-axis control unit 310 to substantially have the characteristics of the torque control is performed. In this case, the control characteristics become such that the interaxial interference force is not generated due to the twist of the driven object 130 although an error of the motor position y of the slave-axis 121a relative to the position command yc is allowed.

As described above, according to the motor control device 300, the characteristics of the slave-axis control unit 310 can be continuously changed from the characteristics of the position control for setting the steady deviation relative to the position command becomes 0 to the characteristics of the torque control for controlling the deviation compensation torque ub generated in the slave-axis control unit 310 to constantly become equal to the master-axis deviation compensation torque ub_m or the characteristics obtained by combining the position control and the torque control, corresponding to intermediate characteristics therebetween, only by setting the reaction-force compensation frequency $\omega h$. As a result, the motor control device 300 can realize a wide range of characteristics supporting the mechanical stiffness of the driven object 130, the magnitude of the interaxial mechanical error, and the purpose in accordance with the usage.

Next, the effects of the dead zone of the torque-correction-amount computing section 41 included in the reaction-force compensation computing section 40S are described. By introducing the dead zone described above, a control operation with the characteristics of the position control, in which the steady deviation becomes 0 for each of the master-axis motor 121b and the slave-axis motor 121a, can be realized under the condition in which the interaxial interference force generated due to the twist of the driven object 130 is smaller than a dead zone width.

By setting the reaction-force compensation frequency $\omega h$ sufficiently large after the dead zone described above is set, a control operation with the characteristics of the torque control for the slave-axis motor 121a can be realized so that a difference between the master-axis torque command u_m and the slave-axis torque command u (specifically, the interaxial interference force) has the magnitude set in the dead zone when the interaxial mechanical error of the driven object 130 is large. Specifically, highly functional control for appropriately changing the characteristics of the position control and the characteristics of the torque control in accordance with the operating condition so that both the master-axis motor position y_m and the slave-axis motor position y become equal to the position command yc while the interaxial interference force is limited to an allowable range set in the dead zone can be realized.

Further, the effects of limiting the motion correction value yh so that the motion correction value does not become larger than the reaction-force compensation limiting value by the reaction-force compensation limiting section 43 included in the reaction-force compensation computing section 40S are described. For example, the case where the slave-axis control unit 310 is set to have the characteristics of the torque control, that is, control of setting the reaction-force compensation frequency $\omega h$ sufficiently large to make the interaxial interference force sufficiently small so as to allow the deviation between the position command yc and the motor position y is considered.

Even in such a case, by limiting the motion correction value yh with the reaction-force compensation limiting value, the position control operates so that the steady deviation between the position reference value yr and the motor position y does not become larger than a predetermined value (more specifically, a value obtained by dividing the reaction-force compensation limiting value by the position gain Kp). As a result, highly functional control in which the characteristics of the position control for limiting the steady deviation in position to the predetermined value or smaller and the characteristics of the torque control appropriately change in accordance with the operating condition can be realized.

The motor control device 300 according to Embodiment 3 operates as described above and performs the computation using the set values of the inertia moment, which are appropriately set respectively in the master-axis feedforward computing section 10M of the master-axis control unit 320 and the feedforward computing section 10S of the slave-axis control unit 310.

Further, based on the comparison between the deviation compensation torque ub corresponding to an internal variable in a middle process of calculating the torque command u in the slave-axis control unit 310, which is a variable before the addition of the feedforward torque uf, and the master-axis deviation compensation torque ub_m corresponding to a similar internal variable in the master-axis control unit 320, the control deviation e of the slave-axis control unit 310 is corrected. In this manner, even if the driven object 130 has asymmetrical characteristics, the acceleration/deceleration of the position of motors for each axis can be controlled with high accuracy while the interaxial interference force due to the twist of the driven object is suppressed.

Further, as a signal used for the comparison as described above, not the output of the feedback torque filter Fb(s), which is indispensable for a higher response of the position control, but the deviation compensation torque ub corresponding to a variable on the input side of the feedback torque filter Fb(s) is used. Therefore, an unnecessary delay in the computation loop including the deviation compensation computing section 20S, the reaction-force compensation computing section 40S, and the control-deviation computing section 50S can be eliminated.

As a result, as the control characteristics of the slave-axis motor 121a, the characteristics of the normal position control with a high response, the characteristics of the torque control based on the reaction-force reference value fr as a reference, and the characteristics obtained with the combination thereof can be switched only by simple setting of the reaction-force compensation frequency ωh. Further, by performing the simple non-linear processing as described above, the highly functional parallel driving control which has characteristics appropriately changing in accordance with the operating condition can be realized.

There is a difference in the usage and in that which of the position control and the speed control serves as a base, between Embodiment 3 to be used for the parallel driving control and Embodiment 1 described above to be used for the web handling control. However, the configuration of the reaction-force compensation computing section 40S of the motor control device 300 of Embodiment 3 is almost the same as that of the reaction-force compensation computing section 40 of the motor control device 100 of Embodiment 1 described above.

Specifically, both of the reaction-force compensation computing sections 40S and 40 can realize a wide range of highly functional characteristics as described above. Therefore, the characteristics suitable for both of the usages can be realized with the same simple program. Accordingly, highly functional control with high performance for each of the usages can be realized without increasing cost for the addition of a program specialized for each of the usages or for remodeling.

The configurations of the feedforward computing section 10S and the master-axis feedforward computing section 10M described above disregard a disturbance such as a friction or a gravity load applied to the driven object 130. If the disturbances described above can be modeled, however, a torque corresponding thereto only needs to be added to the feedforward torque uf and the master-axis feedforward torque uf_m. In this manner, even when the disturbances are asymmetrical, the interaxial interference force can be suppressed with desired characteristics while the motor 121a and the master-axis motor 121b are controlled with high accuracy.

Moreover, in Embodiment 3, the technology has been described as that for controlling the positions of the master-axis motor 121b and the slave-axis motor 121a. However, it is easily understood that completely the same configuration can be used even for controlling the speed.

Although the case where the rotary motor is used has been described above, the case where a linear motor is used is treated in completely the same manner. In this case, the term "torque" only needs to be replaced by a "thrust" or a "driving force" for collectively referring to the torque and the thrust.

As described above, according to Embodiment 3, in the usage for the parallel driving control, the highly functional control device having a wide range of characteristics obtained by combining the position control of each of the axes and the control for suppressing the interaxial interference force due to the twist of the driven object can be realized with the simple computations. Further, in the usage for the parallel driving control, even when the driven object is asymmetrical, the highly functional control device having a wide range of characteristics obtained by combining the position control of each of the axes and the control for suppressing the interaxial interference force due to the twist of the driven object while performing the acceleration/deceleration with the plurality of axes brought into synchronization at high accuracy can be realized with the simple computations.

Embodiment 4

Figure 12:
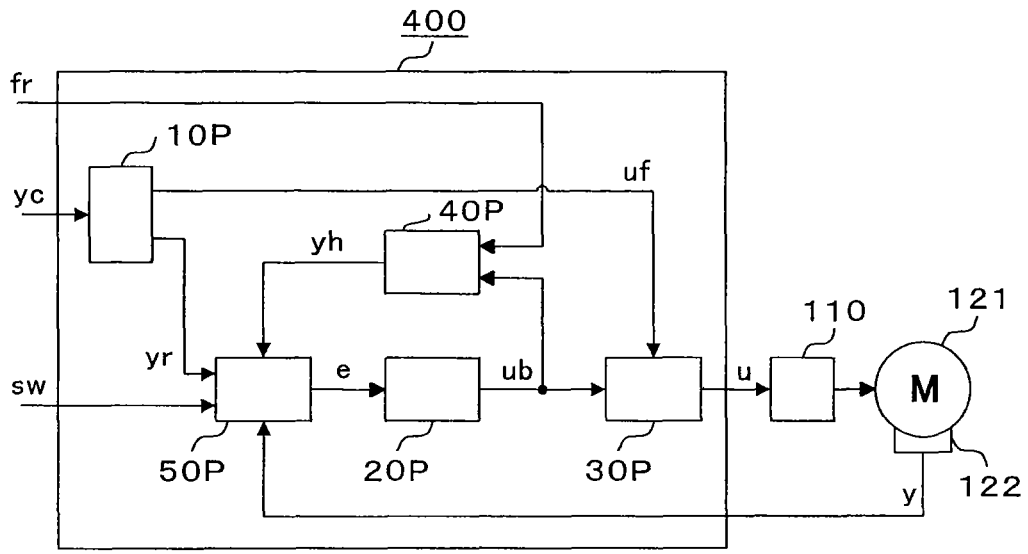
FIG. 12 A block diagram illustrating a motor control device of Embodiment 4 of the present invention.

FIG. 12 is a block diagram illustrating a motor control device of Embodiment 4 of the present invention. A motor control device 400 illustrated in FIG. 12 includes a feedforward computing section 10P, a deviation compensation computing section 20P, a torque-command synthesizing section 30P, a reaction-force compensation computing section 40P, and a control-deviation computing section 50P. The above-mentioned motor control device 400 of Embodiment 4 supposes a usage for a press machine or the like and therefore, supposes a usage for press control in which a driven object is moved to be nearly brought into contact with a pressurized target and thereafter an operation of pressurizing the pressurized target by the driven object with a predetermined force.

Figure 13:
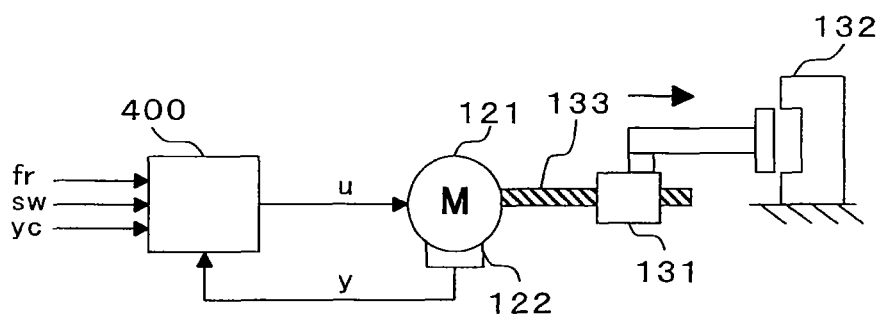
FIG. 13 A schematic view of a press control system using the motor control device of Embodiment 4 of the present invention.

FIG. 13 is a schematic view of a press control system using the motor control device 400 of Embodiment 4 of the present invention. First, a schema of an operation of the press control system is described below with reference to FIGS. 12 and 13.

The motor 121 generates a torque so as to be driven. As a result, a driven object 131 illustrated in FIG. 13 is driven through an intermediation of a transmission mechanism 133 such as a ball screw. The motor control device 400 fetches the position command yc, the reaction-force reference value fr, a mode switching signal sw, and the motor position y detected by the motion detector 122 as inputs. Then, the motor control device 400 outputs the torque command u to the current controller 110 (not shown in FIG. 13) by a computation described later.

By the control of the current of the motor 121 with the current controller 110, the motor 121 generates a torque in response to the torque command u. The position command yc input to the motor control device 400 is given so that the driven object 131 moves so as to nearly come into contact with a pressurized target 132.

The mode switching signal sw is given as a signal for performing switching between a position control mode in which the motor control device 400 performs the position control and a pressurization control mode in which pressurization control is performed so that the switching is performed while the motor control device 400 is performing the control operation when the driven object 131 is in the vicinity where the driven object comes into contact with the pressurized target 132. After the motor control device 400 is switched to operate in the pressurization control mode, the motor control device 400 performs control so that the driven object 131 pressurizes the pressurized target 132 with a force corresponding to the reaction-force reference value fr.

Next, a configuration of the motor control device 400 is described with reference to FIG. 12 referred to above. Similarly to the feedforward computing section 10S described above in Embodiment 3, based on the position command yc, the feedforward computing section 10P included in the motor control device 400 computes and outputs the position reference value (motion reference value) yr serving as a reference value for controlling the motor position y of the motor 121 and a torque necessary for the acceleration/deceleration of the motor 121 in accordance with the position reference value yr, as the feedforward torque uf.

The control-deviation computing section 50P receives the position reference value yr, the motor position y, the motion correction value yh described below, and the mode switching signal sw as inputs to output the control deviation e corresponding to a deviation signal to be reduced by the feedback control by a computation described later.

Next, similarly to the deviation compensation computing section 20 described above in Embodiment 1, the deviation compensation computing section 20P outputs the result of the proportional-integral (PI) computation expressed by Equation (1) given above, which is performed as the feedback control computation including the integral operation for reducing the control deviation e to 0 in a steady manner, as the deviation compensation torque ub.

Next, similarly to the torque-command synthesizing section 30 of Embodiment 1 described above, the torque-command synthesizing section 30P receives the deviation compensation torque ub and the feedforward torque uf as inputs to output the torque command u as a result of the computation using the feedback torque filter Fb(s) expressed by Equation (2) given above. Here, the feedback torque filter Fb(s) has the purpose of setting a gain of the deviation compensation computing section 20P high so as to enable a reduction of the control deviation e at a high response. Therefore, the feedback torque filter Fb(s) in the torque-command synthesizing section 30P is indispensable for the normal position control and provides complex characteristics in some cases.

Next, the reaction-force compensation computing section 40P receives the reaction-force reference value fr and the deviation compensation torque ub as inputs to output the motion correction value yh, similarly to the reaction-force compensation computing section 40 of Embodiment 1 described above. Specifically, the reaction-force deviation fe corresponding to a difference between the reaction-force reference value fr and the deviation compensation torque ub is computed as the torque correction amount uh. Further, the torque correction amount uh is multiplied by a predetermined reaction-force compensation gain Kh in the reaction-force compensation amplifying section 42. Then, the result obtained by limiting the magnitude of the output of the reaction-force compensation amplifying section 42 with a predetermined reaction-force compensation limiting value in the reaction-force compensation limiting section 43 is output. Further, the result obtained by performing the computation with the low-pass filter Fh(s) expressed by Equation (3) given above on the output of the reaction-force compensation limiting section 43 in the reaction-force compensation filter 44 is output as the motion correction value yh.

Moreover, as in the case of Embodiment 1 described above, the reaction-force compensation computing section 40P sets the cutoff frequency $\omega f$ of the low-pass filter Fh(s) so as to become equal to the zero point (integral gain) $\omega i$ of the deviation compensation computing section 20P, specifically, as expressed by Equation (4) given above. Further, the reaction-force compensation computing section 40P sets the reaction-force compensation gain Kh as expressed by Equation (5) given above based on the reaction-force compensation frequency $\omega h$ corresponding to a parameter set from the exterior and the control parameters of the deviation compensation computing section 20P.

Next, an operation of the control-deviation computing section 50P relating to the mode switching signal sw is described. First, an operation performed when the mode switching signal sw selects the position control mode is described. The control-deviation computing section 50P in this case outputs the control deviation e by the same computation as that performed when the motion correction value yh is set to 0 in the control-deviation computing section 50S illustrated in FIG. 9 and described above in Embodiment 3.

Specifically, a signal obtained by adding a signal obtained by multiplying the position deviation ye corresponding to a deviation between the position reference value yr and the motor position y by the position gain Kp and a signal (speed deviation) obtained by differentiating the position deviation ye is output as the control deviation e. As a result, the motor control device 400 operates as the type of position control device called reference model type control.

Next, the case where the mode switching signal sw selects the pressurization control mode is described. The control-deviation computing section 50P outputs a value obtained by subtracting a differential value of the motor position y (specifically, a motor speed) from the motion correction value yh as the control deviation e. Specifically, the control-deviation computing section 50P performs a computation expressed by the following Equation (14).

$$e = yh - s \times y \quad (14)$$

As a result, in addition to the consideration of the computation for the PI control performed by the deviation compensation computing section 20P, the motor control device 400 operates for speed PI control regarding the motion correction value yh as the speed command, by the operations of the control-deviation computing section 50P and the deviation compensation computing section 20P.

Further, in the pressurization control mode, the motion correction value yh is computed as described above by the reaction-force compensation computing section 40P. Therefore, a transfer function from the reaction-force reference value fr to the deviation compensation torque ub and a transfer function from the motor position y to the deviation compensation torque ub in the case where the limiting operation of the reaction-force compensation limiting section in the reaction-force compensation computing section 40P is disregarded are expressed as Equations (15) and (16), respectively.

$$ub/fr = \omega h/(s + \omega h) \quad (15)$$

$$ub/y = -Kv \times s \times (s + \omega i)/(s + \omega h) \quad (16)$$

Here, assuming that the reaction-force compensation frequency $\omega h$ is zero, Equation (15) given above becomes zero. Moreover, Equation (16) given above expresses the proportional-integral (PI) characteristic with respect to the motor speed, that is, a differential value of the motor position y (s×y). Specifically, the operation of the motor control device 400 has a characteristic of speed PI control with the speed command being zero.

When the reaction-force compensation frequency $\omega h$ is increased to substantial infinity (maximum value limited by a control period), Equation (15) given above substantially becomes 1, whereas Equation (16) given above substantially becomes 0. Specifically, the characteristics of the motor control device 400 become the characteristics of torque control for making the deviation compensation torque ub equal to the reaction-force reference value fr. The characteristics of the torque control described above become characteristics suited for the purpose when, for example, the pressurized target 132, which hardly vibrates because of large viscosity, is desired to be pressurized with a desired force.

Moreover, when the reaction-force compensation frequency $\omega h$ is set to the intermediate value described above, the motor control device has the characteristics of torque control for making the deviation compensation torque ub equal to the reaction-force reference value fr at frequencies lower than the reaction-force compensation frequency $\omega h$ in view of Equations (15) and (16) given above. On the other hand, at frequencies higher than the reaction-force compensation frequency $\omega h$, the motor control device has the characteristics of the speed control for making the speed of the motor 121 close to 0. As described above, the motor control device 400 has the characteristics corresponding to the combination of the torque control and the speed control.

Here, the case where vibrations are likely to occur when the driven object 131 is pressed against the pressurized target 132 due to, for example, elasticity of the pressurized target 132 or a method of fixing the pressurized target 132 is considered. Even in such a case, by providing the characteristics corresponding to the combination of the torque control and the speed control, stable press control for pressurizing the pressurized target 132 with a force corresponding to the reaction-force reference value fr in a steady manner while suppressing the vibrations is enabled.

Next, for example, the case where the mode switching signal sw is switched from the position control mode to the pressurization control mode at time at which the driven object 131 does not completely reach the pressurized target 132 is considered. In such a case, when the torque command u or the deviation compensation torque ub is made immediately equal to the reaction-force reference value fr, the speeds of the motor 121 and the driven object 131 increase to disadvantageously increase an impact at the time of pressing.

To cope with the problem described above, in the motor control device 400 of Embodiment 4, the magnitude of the motion correction value yh is limited by the reaction-force compensation limiting value by the function of the reaction-force compensation limiting section 43 of the reaction-force compensation computing section 40P. Moreover, the motion correction value yh operates as the speed command of the speed PI control as described above. Thus, the motor 121 and the driven object 131 can be operated substantially in a state of the speed control so that the speed of the motor 121 is kept to a predetermined limit speed.

Then, if a pressure is generated between the driven object 131 and the pressurized target 132 after the driven object 131 comes in contact with the pressurized target 132 in the state of substantial speed control described above, the deviation compensation torque ub increases against the pressure to become closer to the reaction-force reference value fr. As a result, the reaction-force deviation fe, that is, the torque correction amount uh is reduced. As a result, when the motion correction value yh output from the reaction-force compensation computing section 40P becomes smaller than the limiting value, the characteristics automatically transit to the above-mentioned characteristics of the torque control or the characteristics corresponding to the combination of the torque control and the speed control. Thus, stable press control for making the deviation compensation torque ub equal to the reaction-force reference value fr can be realized.

Moreover, in the description given above, the computation of the control-deviation computing section 50P is switched based on the mode switching signal sw input from the exterior. However, even without inputting the mode switching signal from the exterior, for example, by a configuration as follows, the position control mode can be automatically switched to the pressurization control mode. As the computation operation of the control deviation e in the control-deviation computing section 50P, the computation of the control deviation e as the position control mode described above and the computation of the control deviation e as the pressurization control mode described above are performed in parallel at any time so that the smaller value of the results of the two computations is selected as the output of the control-deviation computing section 50P. As a result, when the driven object 131 comes into contact with the pressurized target 132 to generate a pressure during the operation in the position control mode, the reaction-force deviation fe and the torque correction amount uh become small. As a result, the control deviation e for the pressurization control mode is selected as the output of the control-deviation computing section 50P so as to realize the control characteristics which allow the automatic and smooth switching to the pressurization control mode during the control operation.

In the description given above, the control-deviation computing section 50P is configured supposing the usage in which the position of the pressurized target is fixed so that the position reference value yr and the speed reference value of the differential value thereof are not used as expressed by Equation (14) given above as the computation performed in the control-deviation computing section 50P in the pressurization mode. However, in the usage in which the position of the pressurized target is not fixed and the pressurized target is pressurized while being moved by using the motor or the like, the computation performed in the control-deviation computing section 50P in the pressurization mode can also be performed using the position reference value yr or the speed reference value obtained by differentiating the position reference value as in the control-deviation computing section 50 of Embodiment 1 described above supposing the web handling control as a usage or in the control-deviation computing section 50S of Embodiment 3 described above supposing the parallel driving control as a usage. In this manner, it is easily understood that control for pressurizing the pressurized target 132 with a force corresponding to the reaction-force reference value fr can be realized while movement with acceleration/deceleration is performed in synchronization with the pressurized target.

In comparison with the configuration of the slave-axis control section 310 of Embodiment 3 described above supposing the parallel driving control as a usage, the configuration of the motor control device 400 of Embodiment 4 supposing the press control as a usage differs only in that the computation of the control-deviation computing section 50P and the computation of the control-deviation computing section 50S slightly differ.

Even in comparison with the motor control device 100 of Embodiment 1 described above supposing the web handling control as a usage, the motor control devices have almost the same configuration although there is a difference between the position control and the speed control. Therefore, for a wide range of usages described above, highly functional control suitable for various usages described above can be realized without increasing the amount of calculation with one piece of software, thereby preventing cost of the motor control device from increasing.

As describe above, according to Embodiment 4, by the configuration described above, a wide range of control characteristics such as the characteristics of the position control or the speed control, the characteristics of the torque control, the characteristics of control obtained by the combination thereof, and smooth switching of the control characteristics can be realized. As a result, highly functional control suitable for the usage of press control can be realized by a simple computation without increasing cost.

As is apparent from Embodiments 1 to 4 described above, the reaction-force reference value fr includes both the case where the reaction-force reference value is input to the motor control device as a predetermined value from the exterior and the case where the reaction-force reference value is generated as a predetermined value by a predetermined computation performed in the motor control device.

The invention claimed is:

1. A motor control device for outputting a driving-force command to a current controller of a motor based on a motion command for a motion of the motor as a speed or a position and a motor motion detection value corresponding to a result of detection of the motion, the motor control device comprising:
   a feedforward computing section for computing a motion reference value corresponding to a reference signal for the motion of the motor and a feedforward driving force based on the motion command;
   a deviation compensation computing section for receiving a control deviation determined by a predetermined computation as an input to output a result of a control computation including an integral computation as a deviation compensation driving force, the control computation being performed by using a preset control parameter so as to reduce the control deviation;
   a driving-force command synthesizing section for outputting the driving-force command to the current controller by a computation for obtaining a sum of the feedforward driving force and the deviation compensation driving force as steady characteristics based on the feedforward driving force and the deviation compensation driving force;
   a reaction-force compensation computing section for computing a motion correction value based on a predetermined reaction-force reference value and the deviation compensation driving force; and
   a control-deviation computing section for computing the control deviation based on a deviation between the motion reference value and the motor motion detection value, and the motion correction value.

2. A motor control device according to claim 1, wherein the driving-force command synthesizing section computes the driving-force command by a computation for removing a predetermined frequency component from the deviation compensation driving force.

3. A motor control device according to claim 1,
   wherein the reaction-force compensation computing section includes:
   a driving-force correction-amount computing section for computing a driving-force correction amount by comparison between the predetermined reaction-force reference value and the deviation compensation driving force; and
   a reaction-force compensation amplifying section for multiplying the driving-force correction amount by a reaction-force compensation gain, and
   wherein the reaction-force compensation computing section computes the motion correction value based on an output of the reaction-force compensation amplifying section.

4. A motor control device according to claim 3, wherein the reaction-force compensation computing section further includes a reaction-force compensation limiter for outputting, as the motion correction valve, a value obtained after limiting an output calculated by the reaction-force compensation amplifying section with a predetermined magnitude.

5. A motor control device according to claim 3,
   wherein the deviation compensation computing section outputs the deviation compensation driving force by performing a proportional-integral computation on the control deviation, and
   wherein the reaction-force compensation computing section includes a reaction-force compensation filter for allowing a low-pass filter to act on the output of the reaction-force compensation amplifying section, and sets a pole of the low-pass filter based on a zero point of the deviation compensation computing section.

6. A motor control device according to claim 3, wherein the deviation compensation computing section computes the deviation compensation driving force by a computation for allowing a transfer function from the control deviation to the deviation compensation driving force to have an integral characteristic.

7. A motor control device according to claim 3, wherein the reaction-force compensation computing section sets the reaction-force compensation gain based on the preset control parameter of the deviation compensation computing section.

8. A motor control device according to claim 1, further comprising a master-axis control unit for generating a master-axis driving-force command to a current controller for a master-axis motor mechanically coupled to the motor,
   wherein the master-axis control unit outputs a signal having a predetermined relation with the master-axis driving-force command to the reaction-force compensation computing section as the predetermined reaction-force reference value.

9. A motor control device according to claim 8,
   wherein the master-axis control unit includes:
   a master-axis feedforward computing section for computing a master-axis motion reference value corresponding to a reference signal for a motion of the master-axis motor and a master-axis feedforward driving force based on the motion command;
   a master-axis control-deviation computing section for computing a master-axis control deviation by subtracting a master-axis motor motion detection value obtained by detecting the motion of the master-axis motor from the master-axis motion reference value;
   a master-axis deviation compensation computing section for receiving the master-axis control deviation as an input to output, as a master-axis deviation compensation driving force, a result of a control computation performed so as to reduce the master-axis control deviation; and a master-axis driving-force command synthesizing section for computing and outputting the master-axis deriving-force command to the current controller for the master-axis motor based on the master-axis feed-forward driving force and the master-axis deviation compensation driving force, and wherein the master-axis control unit outputs the master-axis deviation compensation driving force to the reaction-force compensation computing section as the predetermined reaction-force reference value.

10. A motor control device according to claim 1, wherein the control-deviation computing section performs switching between a first mode in which the control deviation is computed without using the motion correction value and a second mode in which the control deviation is computed based on the motion correction value, based on a predetermined mode switching signal during a control operation, to output the control deviation.

* * * * *